United States Patent
Neubert et al.

(10) Patent No.: US 9,632,494 B2
(45) Date of Patent: Apr. 25, 2017

(54) METHOD FOR GENERATING AND HANDLING APPLICATIONS FOR COMPONENTS OF A DISTRIBUTED CONTROL SYSTEM AND ENGINEERING SYSTEM FOR IMPLEMENTING THE PROCESS

(71) Applicant: Schneider Electric Automation GmbH, Marktheidenfeld (DE)

(72) Inventors: Ralf Neubert, Aschaffenburg (DE); Karl-Heinz Wenzel, Niedernberg (DE)

(73) Assignee: SCHNEIDER ELECTRIC AUTOMATION GMBH, Seligenstadt (DE)

(*) Notice: Subject to any disclaimer, the term of this patent is extended or adjusted under 35 U.S.C. 154(b) by 486 days.

(21) Appl. No.: 14/345,841

(22) PCT Filed: Sep. 19, 2012

(86) PCT No.: PCT/EP2012/068471
§ 371 (c)(1),
(2) Date: Mar. 19, 2014

(87) PCT Pub. No.: WO2013/041590
PCT Pub. Date: Mar. 28, 2013

(65) Prior Publication Data
US 2014/0228978 A1 Aug. 14, 2014

(30) Foreign Application Priority Data
Sep. 19, 2011 (DE) .................. 10 2011 053 757

(51) Int. Cl.
*G05B 15/02* (2006.01)
*G05B 19/042* (2006.01)
*G06F 9/44* (2006.01)

(52) U.S. Cl.
CPC .......... *G05B 19/0426* (2013.01); *G06F 8/30* (2013.01)

(58) Field of Classification Search
CPC ..... G06F 8/20; G06F 8/10; G06F 8/60; G06F 9/44505
See application file for complete search history.

(56) References Cited

U.S. PATENT DOCUMENTS 7,272,457 B2   9/2007  Glanzer et al.
7,451,431 B2 * 11/2008  Howerter .................. G06F 8/20
                                                 707/999.102
(Continued)

FOREIGN PATENT DOCUMENTS

CN    101344773 A   1/2009
CN    102098273 A   6/2011
(Continued)

OTHER PUBLICATIONS

International Search Report mailed Feb. 12, 2013, corresponding to International Application No. PCT/EP2012/068471.
(Continued)

*Primary Examiner* — Darrin Dunn
(74) *Attorney, Agent, or Firm* — Ladas & Parry LLP

(57) ABSTRACT

A method and an engineering system for generating and handling component applications (CA1 . . . CAn) for physical components (C1 . . . Cn) such as a programmable control (Programmable Logic Control (PLC)), Human Machine Interface (HMI) and/or a Supervisory Control and Data Acquisition Unit (SCADA) of a control system (CA), in which instances (ICF1 . . . ICFn) of component functions (CF1 . . . CFn) for the components (C1 . . . Cn) are produced and from which the component applications (CA1 . . . CAn)

(Continued)

Figure 1:
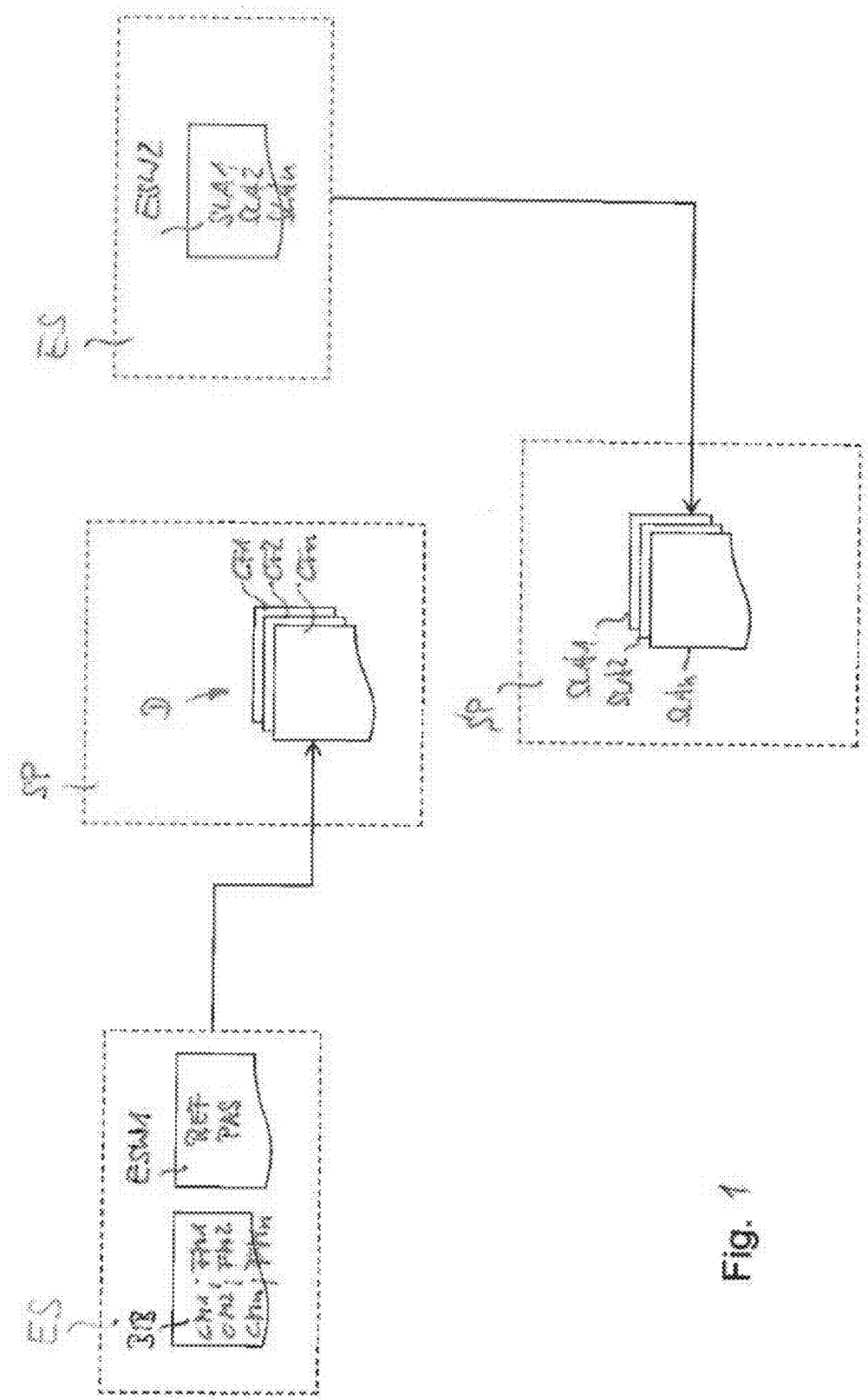

are generated, the generated component applications (CA1 . . . CAn) being loaded to the physical components (C1 . . . Cn).

21 Claims, 9 Drawing Sheets

(56) References Cited

U.S. PATENT DOCUMENTS

| | | | |
|---|---|---|---|
| 7,818,753 B2 | 10/2010 | Hassinger et al. | |
| 7,849,438 B1* | 12/2010 | Hemmat | G06Q 10/06 717/102 |
| 9,134,726 B2 | 9/2015 | Colombo et al. | |
| 2004/0010772 A1* | 1/2004 | McKenna | G06Q 10/06 717/101 |
| 2007/0162170 A1* | 7/2007 | Nakamura | G05B 19/41805 700/95 |
| 2008/0255696 A1* | 10/2008 | Chaar | G06F 8/10 700/108 |
| 2008/0256505 A1* | 10/2008 | Chaar | G06F 8/10 717/100 |
| 2010/0017782 A1* | 1/2010 | Chaar | G06Q 10/06 717/101 |
| 2010/0023921 A1* | 1/2010 | Chaar | G06Q 10/06 717/102 |
| 2010/0131076 A1* | 5/2010 | Colombo | G06F 8/00 700/7 |
| 2010/0218162 A1* | 8/2010 | Channabasavaiah | G06F 8/10 717/102 |
| 2010/0292810 A1* | 11/2010 | Colombo | G05B 19/4188 700/29 |
| 2011/0106275 A1* | 5/2011 | Kanamatareddy | G06F 17/30528 700/13 |
| 2011/0126168 A1* | 5/2011 | Ilyayev | G06F 9/5072 717/103 |

FOREIGN PATENT DOCUMENTS

| | | | |
|---|---|---|---|
| CN | 102323785 A | 1/2012 | |
| CN | 102640068 A | 8/2012 | |
| DE | WO 2011029887 A2 * | 3/2011 | G05B 19/4188 |
| EP | 2 360 542 | 8/2011 | |

OTHER PUBLICATIONS

Reuter T et al: "Projektieren Loest Das Programmieren AB", Elektronik, IRL Press Limited, DE, vol. 46, No. 3, Feb. 4, 1997, pp. 58-64, XP000722490, cited in International Search Report mailed Feb. 12, 2013, corresponding to International Application No. PCT/EP2012/068471, referring to category X.
Weck M et al: "Abteilungsuebergreifendes Projektieren Komplexer Maschinen Und Anlagen. Omethodik Und Systemkonzept Zur Verbesserung Der Zusammenarbeit", VDI Z, Springer VDI Verlag, DE, vol. 137, No. 10, Oct. 1, 1995, cited in International Search Report mailed Feb. 12, 2013, corresponding to International Application No. PCT/EP2012/068471, referring to category X.
Search Report dated May 11, 2016 for Chinese Application No. 2012800456333.
Espacenet English abstract of CN 102323785 A.
Espacenet English abstract of CN 102098273 A.
Espacenet English abstract of CN 102640068 A.
Espacenet English abstract of CN 101344773 A.

* cited by examiner

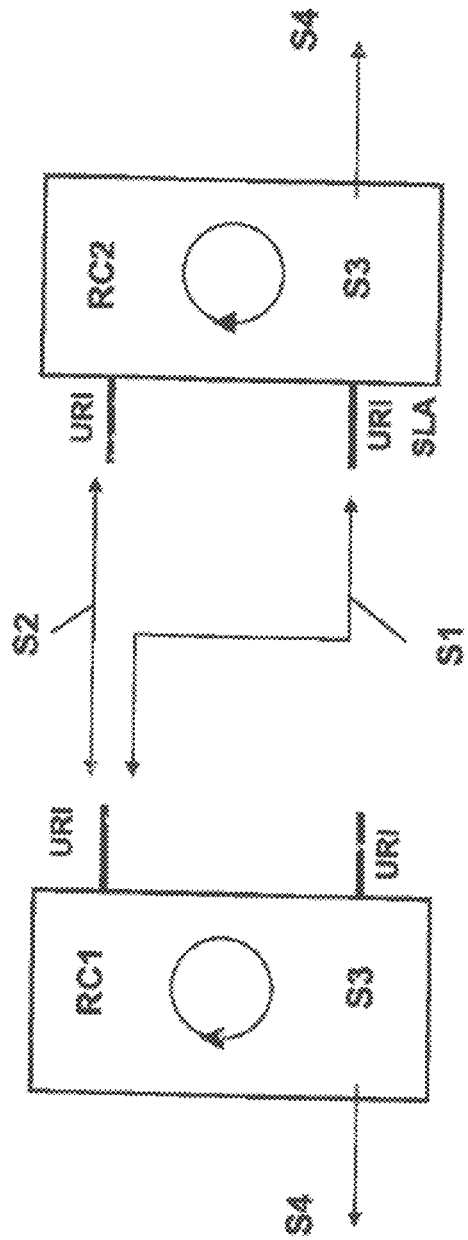

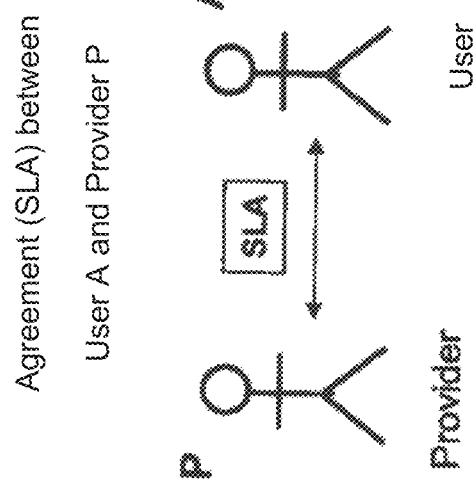

Distribution of SLAs to Objects through Web Services (WS)

METHOD FOR GENERATING AND HANDLING APPLICATIONS FOR COMPONENTS OF A DISTRIBUTED CONTROL SYSTEM AND ENGINEERING SYSTEM FOR IMPLEMENTING THE PROCESS

This application is a 371 of PCT/EP2012/068471, filed on Sep. 19, 2012, which claims priority to German Application No. 102011053757.0, filed Sep. 19, 2011.

The invention relates to a method for generating and handling applications for physical components of a distributed control system, according to the preamble of claim 1, and to an engineering system according to the preamble of claim 21.

Ordinarily, the generation of an application, such as a control application comprising control logic and configuration data, for example, is performed centrally on a workstation such as a personal computer. This is the case even if the planning and drafting of an application such as a control application have been performed distributed over multiple workstations.

The resulting application is then generated by the central workstation. Due to the need to project the volumes of data to be exchanged, the relationship thereof, such as the handling of cross-references, for example, and the number of communications paths that are required for data and for the distribution of the system configuration and logic as a whole to the assigned physical control system components, such as PLC (Programmable Logic Control), HMI (Human Machine Interface) and SCADA (Supervisory Control and Data Acquisition), for example, the known method and/or system offers only low efficiency, scalability and reliability the moment the central workstation is disrupted or access thereto is limited.

A method of this type is described, for example, in EP 2 360 542 A1, which relates to a method for projecting a process image that can be displayed on a control and monitoring device by means of an engineering system. In this case, the process image comprises a plurality of image objects, which represent components of a technical process to be controlled and which are generated using projection software of the engineering system from instances, each of which is formed by means of the projection software by instantiation of a type. Through a suitable measure, a clear assignment of an image object to a component can be enabled. However, the process is implemented on a central engineering system.

Proceeding from the above, the object of the present invention is to further develop a method and a system of the type described in the introductory part, such that the capacity for generating and handling applications for components of a distributed control system is improved.

The object is attained according to the invention by the features of claim 1.

According to a preferred procedure, it is provided that the interaction between the representatives and between the representatives and the physical components assigned thereto is controlled via service level agreements (SLAs).

It is therefore possible for the interaction between the representatives and between the representatives and the physical components assigned thereto to be activated or deactivated via the service level agreements.

The generation of the component applications can also be activated or deactivated in a representative via service level agreements.

The invention is further characterized in that the generation of a component application is verified or can be verified within the assigned representative via a service level agreement.

Moreover, the service level agreements open up the possibility of verifying the generation of component applications based upon the physical component or the transfer of generated data to the physical component.

Preferably, the interaction between the representatives comprises the definition and the comparison of parameters, the drafting of control strategies and the visualization of control logic.

A further preferred embodiment of the method is characterized in that the use of the generated component applications is controlled by assigning user's rights with respect to the range of functions and access to data.

The generated component applications can be distributed to the additional components of the control system by means of the physical component in the form of the supervisory control and data acquisition unit, taking the service level agreements into consideration.

The generation of a component application preferably comprises the following process steps:
- querying/verifying a service level agreement for generating a component application between the representatives,
- interaction between the representatives on the basis of web services,
- generating a component application in the representative, wherein the generation is verified by an internal service level agreement unit of the relevant representative,
- distributing the component application to the assigned physical component, wherein a verification is optionally performed in advance by the service level agreement unit.

In summary, the invention is characterized by the following features:
- the generation of applications is distributed to various components of a cloud-based environment,
- the distributed generation is carried out over the cloud-based environment,
- the cloud-based infrastructure hosted representatives such as software tools of the physical components, by which the assigned physical components of the control system to be generated, such as a PLC, HMI, or SCADA, are represented,
- the distributed generation of the specific applications, such as a control application, an HMI application, and a SCADA application, is carried out by an interaction of the representatives,
- the distributed generation of the specific applications and/or partial applications is linked to specific service level agreements (SLAs),
- each generation of a specific application is controlled, for example, activated or deactivated, via a predefined service level agreement,
- each generation of a specific application within the hosting cloud-based environment is verified by a service level agreement, and
- each specific generation referred to a physical component, such as a PLC, for example, or the transfer of generated data to said physical component are verified via a service level agreement.

In relation to the prior art, higher efficiency, scalability and availability are achieved; in particular, the time required for generating or for updating configuration and/or application data and for distributing these data to the assigned physical components of the system is reduced. This is achieved by shifting the previously centralized generation of applications for PLCs, HMIs and SCADAs to distributed representatives, which interact over the cloud-based environment. By controlling communication among the representatives and/or between the representatives and the physical components by means of service level agreements, a service level agreement management capability is made available during the planning and drafting phase, the activation phase and/or the implementation phase.

Due to the cloud-based infrastructure, improved scalability of the system is achieved.

A further development is characterized in that the component functions are generated for specific subscribers, in the form of object types from component models and/or functional models stored in a library, using specific references and sets of parameters for the component functions to be used, the communication thereof, logic and variables.

The specific component functions for an application as a whole are identified, and, once the underlying ranges of functions have been verified, the instances are generated from the selected component functions. Further, a transfer of the necessary parameters, including the range of functions parameter that is relevant for the generation of the component applications, takes place.

The instances are preferably distributed by means of a resource management component to components of the cloud-based environment and are implemented on lower-level resources, such as servers, for executing the respective instances.

Particularly preferably, the component applications within one instance of a representative are generated by object representatives, wherein a communications parameter generating unit for generating communications parameters, an application logic generating unit for generating application logic and/or a configuration information generating unit for generating configuration information is provided.

The communications parameters preferably represent a variable, a baud rate or a storage location. The application logic can represent a functional building block, an input variable, a storage location and/or an output variable and the configuration information can represent a color for a background or a menu language.

It is preferably provided that the service level agreements for the generation of the component application are defined and verified in a service level application unit of the instance of the representative.

The service level agreement unit also controls the interaction of the object representatives within the representatives and the interaction with other representatives and/or the distribution of the generated component application.

The method is further characterized in that communication is carried out via an interface using a uniform resource identifier, which consists of a sequence of characters that is used for addressing/identifying an abstract or physical resource.

The invention further relates to an engineering system for generating and handling component applications for physical components, comprising means for generating instances of component functions of the components, wherein the component applications are generated by the instances and wherein the engineering system has means for loading the generated component applications onto the physical components. According to the invention, it is provided that the engineering system has means for distributing the instances as representatives of the component functions within a cloud-based environment, wherein each of the instances has object representatives in the form of a communications parameter generating unit, an application logic generating unit and/or a configuration information generating unit for generating the component application. The distribution of the instances to resources of a cloud-based environment allows parallel processing rather than sequential processing to be achieved.

For a user-defined or license-based control of generation, the instance of the representative has a service level application unit, in which service level agreements for generation of the component application are defined and verified.

It is further provided that the object representatives have interfaces for communication via a uniform resource identifier.

Additional details, advantages and features of the invention are provided both in the claims, and the features found therein—alone and/or in combination—and in the following description of preferred embodiment examples.

Figure 2:
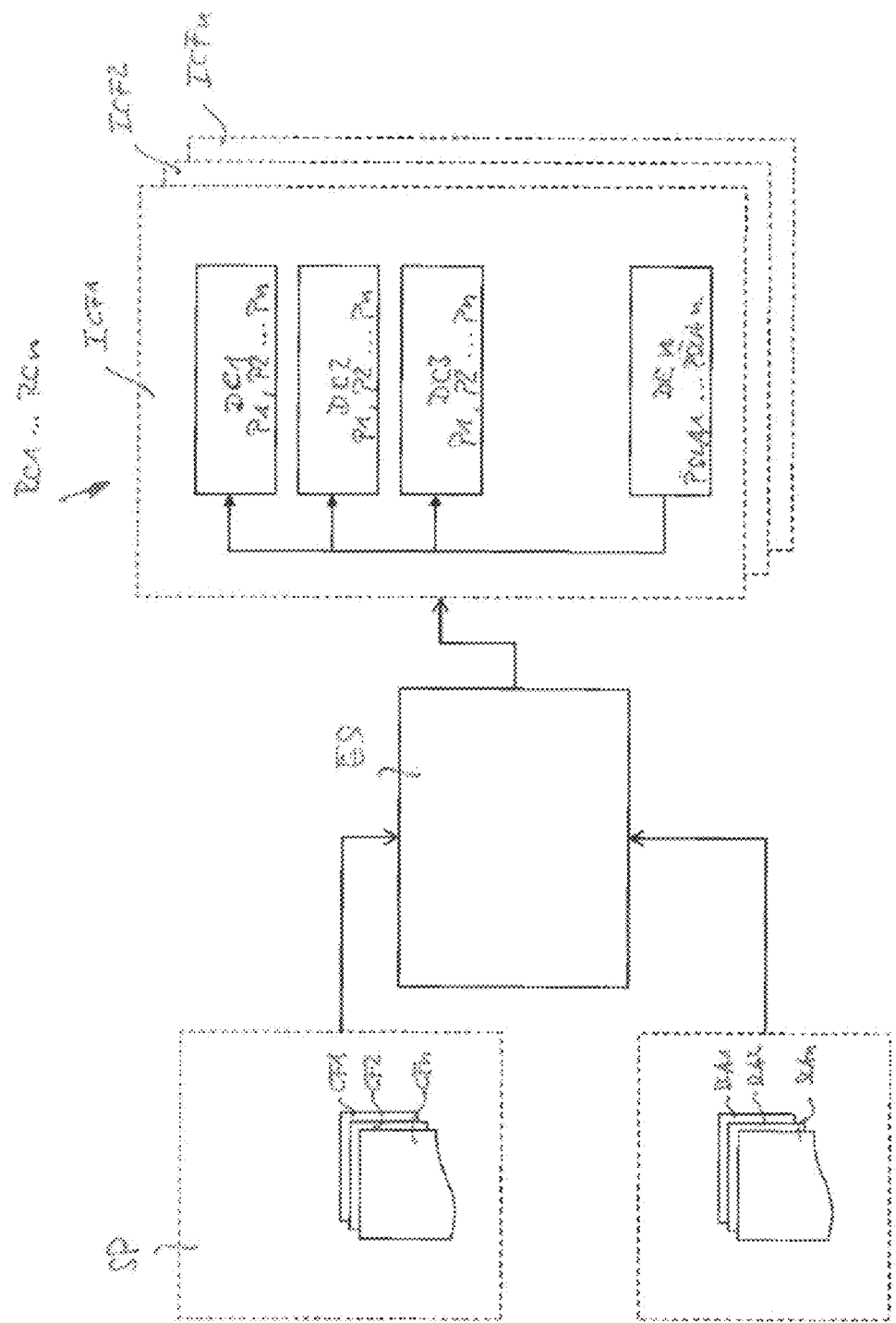
Figure 3:
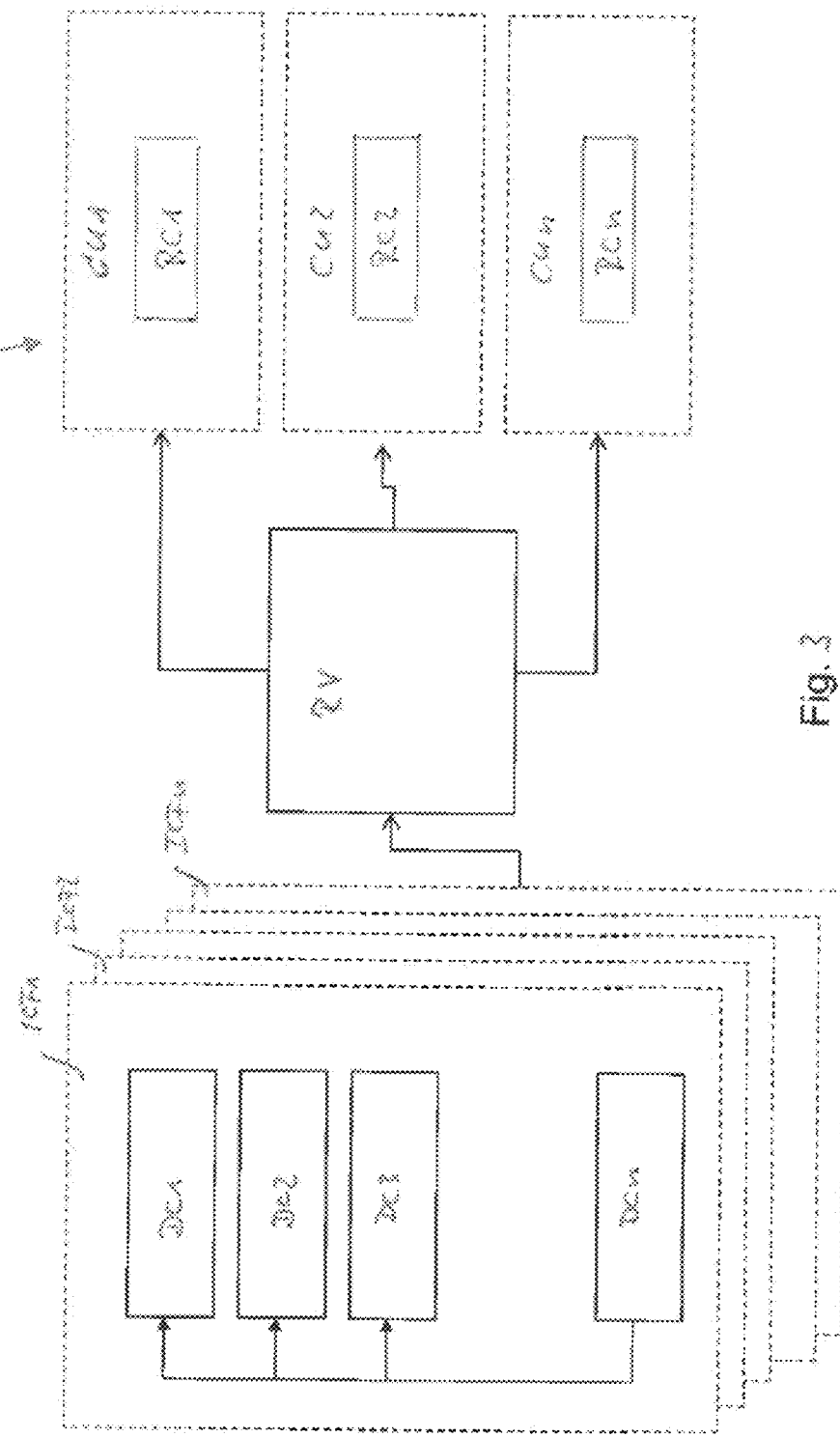
Figure 4:
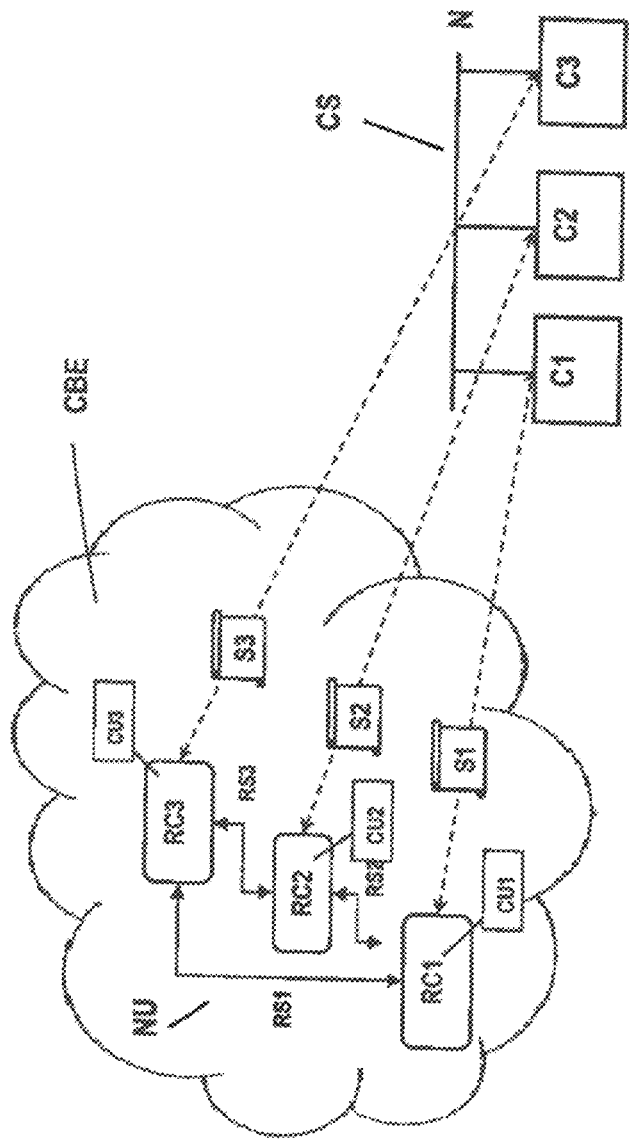
Figure 5:
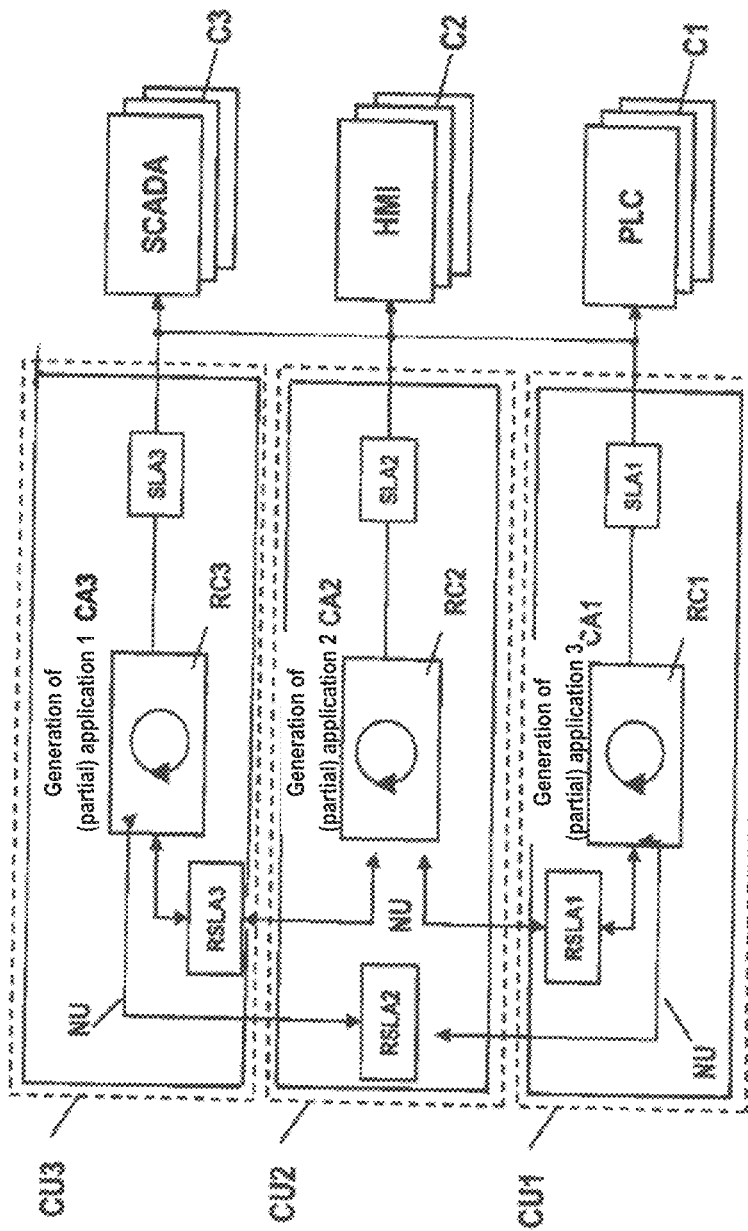
Figure 6:
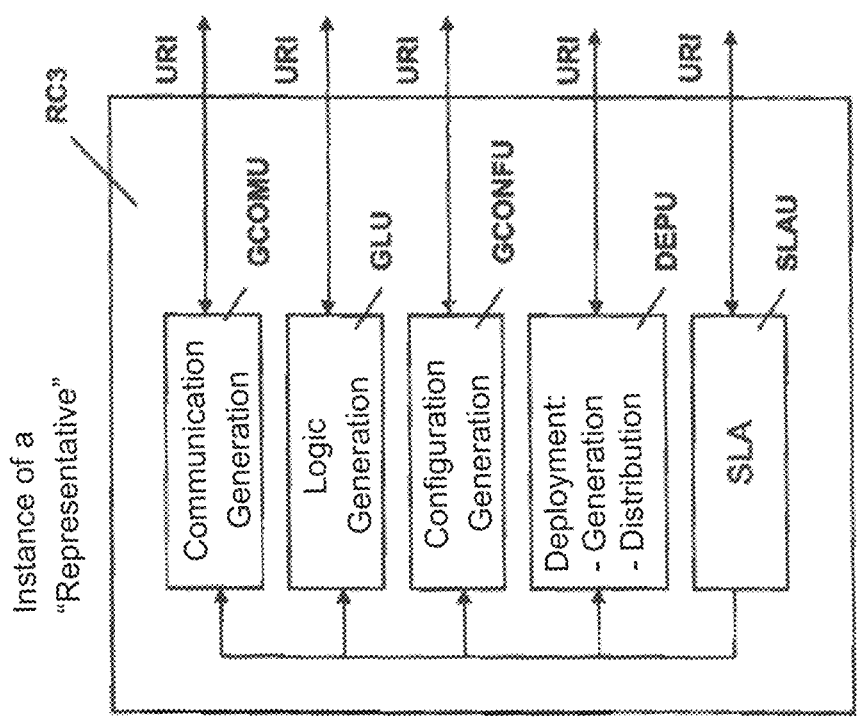

Shown in the set of drawings are:

FIG. 1 a schematic illustration of an engineering system for projecting and storing data that are required for a distributed generation of applications, and for defining customer-specific or license-based ranges of functions as service level agreements, FIG. 2 process steps for generating instances of a representative of a component function, FIG. 3 process steps for distributing instances to resources in a cloud-based environment, FIG. 4 a schematic illustration of a control system and the representatives thereof in a cloud-based environment, FIG. 5 a schematic illustration of the distributed generation of a control application, FIG. 6 a schematic illustration of the implementation of a representative and/or an object in the cloud-based environment, FIG. 7 a schematic illustration of the communication between representatives and/or objects and FIG. 8 a schematic illustration of the definition and the activation of service level agreements (SLAs).

FIG. 1 shows a purely schematic illustration of an engineering system ES having a library BIB, in which component models CM1, CM2 . . . CMn of components C1, C2 . . . Cn or functional models FM1, FM2 . . . FMn of a control system CS to be projected are stored. The component models CM1, CM2 . . . CMn or functional models FM1, FM2 . . . FMn describe, for example, a logic and/or a communication of a memory-programmable controller SPS, functions of an HMI (Human Machine Interface) or functions of a Supervisory Control and Data Acquisition (SCADA) unit. The component models CM1, CM2 . . . CMn or functional models FM1, FM2 . . . FMn can represent functional building blocks, communications parameters or image descriptions.

The engineering system ES further comprises engineering software ESW1, by means of which the references REF and parameter sets PAS for the component functions to be used, and the communication, logic and variables thereof are defined for the components C1, C2 . . . Cn, such as PLC, HMI or SCADA.

The data D that are required for the generation of component applications CA1, CA2 . . . CAn of the application as a whole are stored in a memory SP as component functions CF1, CF2 . . . CFn in the form of object types. Examples of component functions are the control logic for a "motor ON/OFF" function and the visualization of the "motor ON/OFF" function.

The engineering system ES further comprises engineering software ESW2 for projecting and/or describing customer-specific or license-based ranges of functions in the form of service level agreements SLA1, SLA2 . . . SLAn, which are stored with the assigned parameters in the memory SP.

The ranges of functions according to SLA1, SLA2 . . . SLAn define, for example, the number and/or the type of use of the components C1 . . . Cn or component functions CF1 . . . CFn that may be used by a user.

FIG. 2 shows a purely schematic illustration of process steps for generating representatives RC1, RC2 . . . RCn of components C1, C2 . . . Cn and/or of component functions CF1, CF2 . . . CFn as instances ICF1, ICF2 . . . ICFn of components C1 . . . Cn or component functions CF1 . . . CFn.

In this connection, the instances ICF1, ICF2 . . . ICFn specific to the application as a whole, which instances represent the functions CF1, CF2 . . . CFn projected therein, are identified. Each of the instances ICF1, ICF2 . . . ICFn has one or more data containers DC1, DC2 . . . DCn as active software modules, in each of which communications data, logic data, configuration data and/or range of function data that correspond with the instantiation are stored and processed.

Before the instances ICF1, ICF2 . . . ICFn are generated, the underlying service level agreements SLA1, SLA2 . . . SLAn are verified, wherein a check is made to determine whether the instance to be generated is permitted and/or whether the required partial functions, such as logic functions or communications functions, are consistent with the respective customer-specific or license-based range of functions.

In the engineering system ES, the instances ICF1, ICF2 . . . ICFn are generated, and the parameters P1, P2 . . . Pn that are required for generating component applications CA1, CA2 . . . CAn, including the range of function parameters PSLA1, PSLA2 . . . PSLAn that are relevant for generating partial applications, are transferred.

FIG. 3 shows a purely schematic illustration of the distribution of the instances ICF1, ICF2 . . . ICFn to resources CU1, CU2 . . . CUn in a cloud-based environment CBE. The distribution is performed in a known manner via a resource management component RV for cloud-based environments. For this purpose, the instances ICF1, ICF2 . . . ICFn are forwarded to the resource management component RV of the cloud-based environment CBE and are then transferred to the corresponding resources CU1, CU2 . . . CUn, such as servers for excuting the respective instances ICF1, ICF2 . . . ICFn, for example. The instances are implemented as representatives RC1, RC2 . . . RCn of components C1, C2 . . . Cn or component functions CF1, CF2 . . . CFn.

FIG. 4 schematically illustrates the control system CS, comprising a network N for connecting the components C1, C2 . . . Cn of the control system for the purpose of data exchange. The components C1, C2 . . . Cn can be embodied as a Programmable Logic Controller (PLC), a Human Machine Interface (HMI), and/or a Supervisory Control and Data Acquisition (SCADA) unit. The components C1 . . . Cn can have inputs/outputs for controlling actuators such as motors, or for detecting sensors, such as limit switches or RFID.

Each physical component C1, C3 . . . Cn of the control system CS or component function CF1 . . . CFn is represented in the cloud-based environment CBE by the instance of the representative RC1, RC1, RC3. The instances of the representatives RC1, RC2, RC3 in the form of software building blocks are hosted on hardware components CU1, CU2, CU3 of the cloud-based environment. By means of interaction between the distributed representatives within the cloud-based environment CBE, a distributed generation of component applications CA1, CA2, CA3 is carried out, such as PLC- and/or control application CA1, HMI application CA2 and SCADA application CA3, for the assigned components C1, C2, C3.

Both the communication between the representatives RC1, RC2, RC3 for generating the applications CA1, CA2, CA3 and the communication between the representatives RC1, RC2, RC3 and the assigned physical components C1, C2, C3 can be controlled via the dedicated service level agreements SLA1, SLA2, SLA3.

FIG. 5 shows a purely schematic illustration of the distributed generation of the applications CA1, CA2, CA3 within the context of the example of the representatives RC1, RC2, RC3 hosted in the cloud-based environment CBE.

The cloud-based environment CBE can be interpreted as a network of spatially distributed computer units CU1, CU2, CU3 which are capable of communicating via a network NU.

The computer units CU1, CU2, CU3 host the representatives RC1, RC2, RC3 of components C1, C2, C3 in the form of corresponding software tools.

The applications CA1, CA2, CA3 are generated in the representatives RC1, RC2, RC3 as a result of the interaction of the components C1, C2, C3 with the respective representatives RC1, RC2, RC3 and as a result of the interaction between the representatives RC1, RC2, RC3 via the network NU of the cloud-based environment CBE, wherein partial application CA1 describes the function "transporting", for example, partial application CA2 describes the function "transmitting", for example, and partial application CA3 describes the function "lifting", for example.

The transfer of applications CA1, CA2, CA3 to physical components C1, C2, C3 and the communication between representatives RC1, RC2, RC3 for generating the applications CA1, CA2, CA3 are controlled via the specific service level agreements SLA1, SLA2, SLA3 and/or RSLA1, RSLA2, RSLA3. It is further possible to distribute the generated applications CA1, CA2, CA3 by means of the physical component C3 such as SCADA, taking into consideration service level agreement SLA3.

FIG. 6 shows a purely schematic illustration of an instance of representative RC3 and the implementation thereof in the cloud-based environment CBE.

According to FIG. 6, the instance of the representative comprises the data containers as object representatives, such as a communications parameter generating unit GCOMU for generating communications parameters, e.g., a variable xy, a baud rate and/or a storage location between memory-programmable controllers PLC1<->PLC2, an application logic generating unit GLU for generating application logic such as a functional building block "DF3_MOVE_UP", an input variable "variable xy", a storage location and/or output variables, and a configuration information generating unit GCONFU for generating configuration information such as a color for a background and a distribution unit DEPU for distributing the generated information to the physical components C1, C2, C3.

Also provided is a service level application unit SLAU, in which service level agreements for generating the control application CA are defined and verified. The service level agreement unit SLAU controls the interaction of the object representatives GCOMU, GLU, GCONFU, DEPU and SLAU within the representative, and the interaction with other representatives RC1, RC2, along with the distribution of the generated partial applications. The interaction within the representative and/or the object RC1, RC2, RC3 and/or outside to the physical components C1, C2, C3 is therefore defined and checked via the service level agreement unit SLAU.

Communication takes place via an interface by means of a uniform resource identifier (URI), which consists of a sequence of characters that is used for addressing/identifying an abstract or physical resource. Here, URIs are used for identifying web-service end points.

FIG. 7 shows a purely schematic illustration of a communication between representatives and/or objects RC1 and RC2 in the case of a distributed generation of a control application. In a first step S1, a querying/verification of a service level agreement SLA1 for generating a control application is performed between the objects RC1, RC2. Assuming the individual generation is permitted, an interaction between the representatives and/or objects RC1, RC2 on the basis of web services is carried out in step S2. In step S3, internal processing in the form of the generation of a partial application is then carried out, wherein the generation is verified by the internal service level agreement unit SLAU of the respective object/representative RC1 and/or RC2.

For the further generation in step S3, the data from the interaction between RC1 and RC2, which have then been authorized and released by the internal service level agreement unit SLAU, are processed with the data D projected according to FIG. 1 and/or FIG. 2, and the executable application parts that are required for the respective physical components C1 . . . Cn, e.g., a program section according to standard IEC 61131-3 for PLC, are generated with corresponding functional building blocks and the specific parameters thereof, and are then distributed in step S4. The projected data and the information obtained by interaction in step S2 are used for compiling executable program parts that are adapted for the target component.

Once the generation of the partial applications has been completed, a distribution of the applications CA1, CA2, CA3 to the physical components C1, C2, C3 is then carried out in step S4, wherein prior to this, a check for an SLA is carried out by the service level agreement unit SLAU.

Figure 8B:
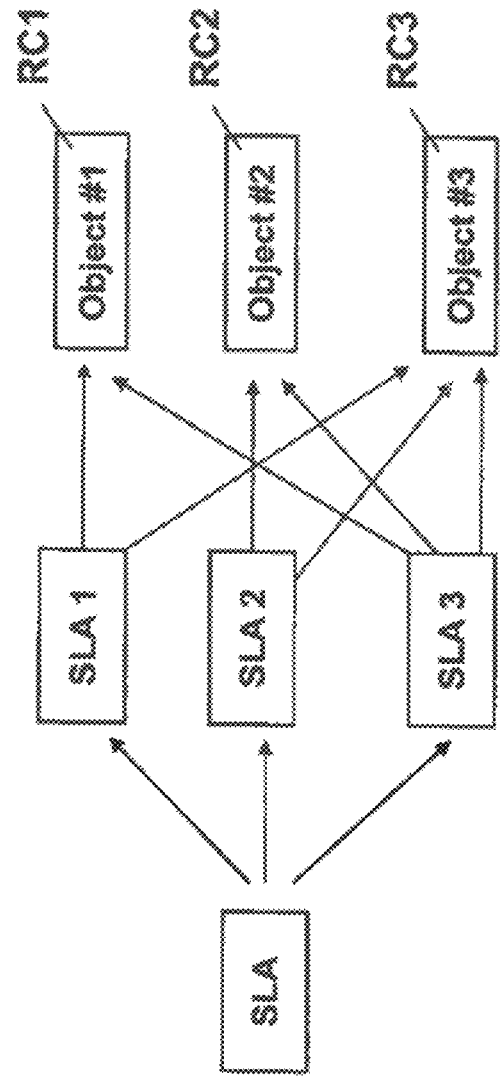

The definition and activation of service level agreements SLA1, SLA2, SLA3 are illustrated schematically in FIGS. 8a and 8b.

The service level agreement is defined as an agreement between a user A and a provider P.

The service level agreements are transferred via web services WS to the individual objects and/or representatives RC1, RC2, RC3. A query and/or verification of the service level agreements SLA1, SLA2, SLA3 is then performed in the respective service level agreement units SLAU of the representatives RC1, RC2, RC3.

At this point it should be noted that service level agreements SLA2, SLA2, SLA3 can be amended at any time and distributed via corresponding web services WS. If a service level agreement SLA1, SLA2, SLA3 is violated in the generation and/or distribution of the control application and/or partial control application, a notification will be sent to the user, who can then make arrangements for the provision of expanded service level agreements (SLAs). Examples of service level agreements are provided below:
SLA1: "a maximum of 100 I/O points may be generated".
SLA2: "if more than 100 MB of data are generated, 15% higher service fees will be charged".
SLA3: "SCADA and PLC1 and PLC2 may only be read".
SLA4: "SCADA and PLC3 and PLC4 may be read and configured".
SLA5: "PLC4 may communicate only with PLC1".

Based upon the definition of the individual service level agreements SLA1 . . . SLA5, the type of use of the representatives within the cloud-based environment CBE and the interactions with physical components can be controlled by the user and/or can be ascertained and billed for on the basis of the service.

The term "distributed generation" is understood to mean the interaction between the representatives of the physical components in the cloud-based environment, wherein, i.a., a comparison between parameters of the one representative with parameters of another representative is performed. In connection with this, so-called cross-reference tables are also generated, to which variables are assigned and/or a logic can be entered and/or read out.

The interaction between the representatives also comprises the definition of parameters, the drafting of control strategies, the visualization of a control logic and the compilation of the application and/or the program, followed by the loading of the generated applications onto the assigned physical components.

The invention claimed is:

1. A method for generating and handling component applications for physical components, comprising the following steps:
   providing component functions in a form of object types from component models or functional models stored in a library, with specific references and sets of parameters for the component functions to be used, along with the communication, logic and variables thereof; and
   selecting component functions that are specific to an application as a whole,
   wherein customer-specific or license-based ranges of functions in a form of service level agreements with assigned range of function parameters are defined,
   wherein, once the service level agreements have been verified, instances are generated from the selected component functions, and a transfer of parameters, including the range of function parameter that is necessary to the generation of the component applications, takes place,
   wherein the instances that are necessary for generating an application as a whole are distributed to resources of a cloud-based environment as representatives of the component functions by a resource management component, and are implemented for execution therein,
   wherein the generation of the component applications in one of the representatives in the cloud based environment comprises a generation of parameter data, configuration data or application logic in the representative,
   wherein the data are exchanged by interaction between the representatives and between the representatives and the assigned physical component, taking into consideration the instantiated sets of parameters and references of the representatives, and
   wherein the generated component applications are loaded onto the physical components.

2. The method according to claim 1, wherein the interaction between the representatives and between the representatives and the assigned physical components is controlled via the service level agreements.

3. The method according to claim 1, wherein the interactions between the representatives and between the representatives and the assigned physical components are activated or deactivated via the service level agreements.

4. The method according to claim 1, wherein the generation of the component application in the representative is activated or deactivated via the service level agreements.

5. The method according to claim 1, wherein the generation of the component application in the representative is verified via the service level agreement.

6. The method according to claim 1, wherein the generation of the component application referred to the physical component or the transfer of generated data to the physical component is verified via the service level agreement.

7. The method according to claim 1, wherein the interaction between the representatives comprises a definition and a comparison of parameters, a drafting of control strategies, and a visualization of control logic.

8. The method according to claim 1, wherein the use of the generated component applications is controlled by issuing user's rights with respect to the range of functions and access to data.

9. The method according to claim 1, wherein the representatives are hosted in the form of software building blocks on at least one hardware component of the cloud-based environment.

10. The method according to claim 1, wherein the generated component applications are distributed by the physical component in the form of a supervisory control and data acquisition unit to the additional components of the control system, taking into consideration the service level agreement.

11. The method according to claim 1, wherein the interaction between the representatives takes place by a uniform resource identifier.

12. The method according to claim 1, wherein the generation of a component application comprises the following process steps:
   querying/verifying a service level agreement for generating a component application between the representatives,
   interaction between the representatives on a basis of web services,
   generating a component application in the representative, wherein the generation is verified via an internal service level agreement unit (SLAU) of the relevant representative,
   distributing the component application to the assigned physical component, wherein a verification is optionally performed in advance via the service level agreement unit.

13. The method according to claim 1, wherein the component application within the instance of a representative is generated by object representatives, wherein communications parameters are generated by a communications parameter generating unit, application logic is generated by an application logic generating unit, or configuration information is generated by a configuration information generating unit.

14. The method according to claim 1, wherein the communications parameter represents a variable, a baud rate, or a storage location, wherein the application logic represents a functional building block, and input variable, a storage location or an output variable, and wherein the configuration information represents a color for a background or a menu language.

15. The method according to claim 1, wherein the service level agreements for generation of the component application are defined and verified in a service level application unit of the instance of the representative.

16. The method according to claim 1, wherein the service level agreement unit controls the interaction of the object representatives within the representative and the interaction with other representatives or the distribution of the generated component application.

17. The method according to claim 1, wherein the communication takes place via an interface by a uniform resource identifier, which consists of a sequence of characters that is used for addressing/identifying an abstract or physical resource.

18. The method according to claim 1, wherein the component applications are generated in parallel in the cloud-based environment.

19. The method according to claim 1, wherein the data from the interaction between the instances, which data are authorized and released via the internal service level agreement unit, are processed with the projected data, and wherein the executable application parts that are required for the respective physical components, are generated with corresponding functional building blocks and the specific parameters thereof, and are then distributed, or, wherein the projected data and the information obtained through interaction are used for compiling executable program parts that are adapted for the target component.

20. The method according to claim 1, wherein the physical component is selected from the group consisting of a programmable logic control, a human machine interface, and a supervisory control and data acquisition unit of a control system.

21. The method according to claim 19, wherein the executable application parts that are required for the respective physical components is a program section according to standard IEC 61131-3 for SPS.

* * * * *